(12) United States Patent
Jacobsen

(10) Patent No.: US 7,000,729 B2
(45) Date of Patent: Feb. 21, 2006

(54) FIVE-LAYER SOUND ABSORBING PAD: IMPROVED ACOUSTICAL ABSORBER

(75) Inventor: William W. Jacobsen, Lewisville, NC (US)

(73) Assignee: Acoustek Nonwovens, Winston-Salem, NC (US)

( * ) Notice: Subject to any disclaimer, the term of this patent is extended or adjusted under 35 U.S.C. 154(b) by 363 days.

(21) Appl. No.: 10/615,128

(22) Filed: Jul. 8, 2003

(65) Prior Publication Data
US 2004/0065507 A1 Apr. 8, 2004

Related U.S. Application Data

(60) Provisional application No. 60/394,455, filed on Jul. 8, 2002.

(51) Int. Cl.
- E04B 1/82 (2006.01)
- E04B 2/02 (2006.01)
- B32B 3/10 (2006.01)
- B32B 3/28 (2006.01)

(52) U.S. Cl. ............ 181/290; 181/291; 181/296; 181/286; 428/137; 428/182

(58) Field of Classification Search .......... 181/290, 181/291, 293, 294, 296, 288, 286, 204, 205, 181/210; 52/144, 145; 252/62; 428/297.1, 428/304.4, 137, 178, 182
See application file for complete search history.

(56) References Cited

U.S. PATENT DOCUMENTS

| | | | | |
|---|---|---|---|---|
| 3,276,928 A | * | 10/1966 | Pearson et al. ........... 156/62.4 |
| 4,011,067 A | | 3/1977 | Carey, Jr. .................. 55/354 |
| 4,041,203 A | | 8/1977 | Brock et al. ............... 428/157 |
| 4,069,026 A | | 1/1978 | Simm et al. .................. 55/6 |
| 4,077,491 A | * | 3/1978 | Hankel ..................... 181/290 |
| 4,118,531 A | | 10/1978 | Hauser ..................... 428/224 |
| T100,902 I4 | | 8/1981 | Hauser ..................... 210/348 |
| 4,302,344 A | | 11/1981 | Ruff et al. ................... 252/62 |
| 4,379,192 A | | 4/1983 | Wahlquist et al. ......... 428/156 |
| 4,420,526 A | | 12/1983 | Schilling et al. ........... 428/171 |
| 4,469,732 A | | 9/1984 | Isaksen et al. ............... 428/80 |
| 4,509,304 A | | 4/1985 | Epes ........................ 52/127.3 |
| 4,551,378 A | | 11/1985 | Carey, Jr. .................. 428/198 |
| 4,588,627 A | | 5/1986 | Isaksen et al. ............... 428/80 |
| 4,588,635 A | | 5/1986 | Donovan ................... 428/288 |
| 4,604,302 A | | 8/1986 | Isaksen et al. ........... 427/208.6 |
| 4,678,822 A | | 7/1987 | Lewllin ..................... 524/12 |
| 4,696,848 A | | 9/1987 | Jones et al. .................. 428/80 |
| 4,804,695 A | | 2/1989 | Horton ...................... 524/27 |
| 4,813,948 A | | 3/1989 | Insley ...................... 604/366 |
| 4,818,599 A | | 4/1989 | Marcus ..................... 428/288 |
| 4,828,910 A | | 5/1989 | Haussling ................. 428/284 |
| 4,837,067 A | | 6/1989 | Carey, Jr. et al. .......... 428/108 |
| 4,840,832 A | | 6/1989 | Weinle et al. ............. 428/156 |
| 4,851,283 A | | 7/1989 | Holtrop et al. ............ 428/284 |
| 4,865,791 A | | 9/1989 | Ferro et al. ................ 264/134 |
| 4,873,132 A | | 10/1989 | Jones et al. ................. 428/80 |
| 4,927,705 A | | 5/1990 | Syme et al. ............... 428/282 |
| 4,992,327 A | | 2/1991 | Donovan et al. .......... 428/296 |
| 5,009,043 A | * | 4/1991 | Kurrasch .................... 52/145 |
| 5,023,131 A | | 6/1991 | Kwok ....................... 442/416 |
| 5,057,168 A | | 10/1991 | Muncrief .................. 156/62.6 |
| 5,073,436 A | | 12/1991 | Antonacci et al. ......... 428/219 |
| 5,118,722 A | | 6/1992 | Wollmann et al. ......... 521/137 |
| 5,139,841 A | | 8/1992 | Makoui et al. |
| 5,154,969 A | | 10/1992 | Kerawalla ................. 428/288 |
| 5,272,000 A | | 12/1993 | Chenoweth et al. ....... 442/416 |
| 5,318,650 A | | 6/1994 | Kerawalla ................. 156/245 |
| 5,362,539 A | | 11/1994 | Hall et al. ................... 428/68 |
| 5,380,580 A | | 1/1995 | Rogers et al. ............. 428/219 |
| 5,401,567 A | | 3/1995 | Knobloch .................. 428/284 |
| 5,439,735 A | | 8/1995 | Jamison ..................... 428/255 |
| 5,443,893 A | | 8/1995 | Herzberg ................... 428/198 |
| 5,476,711 A | | 12/1995 | Hebbard et al. ........... 442/416 |
| 5,491,186 A | | 2/1996 | Kean et al. .................. 524/13 |
| 5,493,081 A | * | 2/1996 | Manigold .................. 181/286 |
| 5,516,580 A | | 5/1996 | Frenette et al. ............ 428/288 |
| 5,532,050 A | | 7/1996 | Brooks ...................... 428/220 |
| 5,545,453 A | | 8/1996 | Grant ........................ 428/43 |
| RE36,323 E | * | 10/1999 | Thompson et al. ........ 181/286 |
| 5,994,242 A | | 11/1999 | Arthurs |
| 6,145,617 A | * | 11/2000 | Alts ......................... 181/290 |
| 6,296,075 B1 | * | 10/2001 | Gish et al. ................. 181/290 |
| 6,345,688 B1 | | 2/2002 | Veen et al. |
| 6,604,603 B1 | * | 8/2003 | Wirth ....................... 181/200 |
| 6,631,785 B1 | * | 10/2003 | Khambete et al. ......... 181/290 |
| 6,659,223 B1 | * | 12/2003 | Allison et al. ............. 181/290 |
| 2004/0055813 A1 | * | 3/2004 | Tsuiki et al. .............. 181/204 |
| 2004/0081797 A1 | * | 4/2004 | Simmons et al. .......... 428/137 |

* cited by examiner

Primary Examiner—Edgardo San Martin
(74) Attorney, Agent, or Firm—Jennifer L. Skord; Moore & Van Allen PLLC

(57) ABSTRACT

An acoustical absorber, having the structure: scrim/film/batt/film/scrim. Preferably, the batt is made from about 60% to about 90% by weight natural fiber and about 10% to about 40% synthetic fiber. Also, a method of making the acoustical absorber is provided. Additionally, a method for acoustically insulating a structure with the acoustical absorber is provided. The method for acoustically insulating may include the steps of compressing the acoustical absorber to less than its original volume prior to installing the absorber and releasing the absorber from compression following the installing step, allowing the material to recover and to fill the void of the structure in which the absorber was placed.

27 Claims, No Drawings

FIVE-LAYER SOUND ABSORBING PAD: IMPROVED ACOUSTICAL ABSORBER

CROSS-REFERENCE

This application is related to U.S. provisional application No. 60/394,455, filed Jul. 8, 2002, entitled "Five-Layer Sound Absorbing Pad: Improved Acoustical Absorber", naming William W. Jacobsen as the inventor. The contents of the provisional application are incorporated here by reference in their entirety, and the benefit of the filing date of the provisional application is hereby claimed for all purposes that are legally served by such claim for the benefit of the filing date.

TECHNICAL FIELD

This invention relates in general to an acoustical absorber, and more particularly, relates to an acoustical absorber formed from a batt in a laminate of synthetic polymeric film and synthetic polymeric scrim. The acoustical absorber is useful in many sound-absorbing applications, for instance, in a motor vehicle body. The acoustical absorber is also useful in and/or on the walls, ceilings, or floors of a building that has or is near a source of loud noise, such as a restaurant, a music recording studio, a factory, an airport, et cetera.

BACKGROUND

Of interest, U.S. Pat. No. 5,516,580, issued May 14, 1996 to Frenette et al., assignors to Groupe Laperriere et Verreault Inc. and Cascades Inc., describes an insulating material of loose fill short cellulose fibers and longer bonding synthetic fibers, and also an outer sheath that is heat-fused with outer sheaths of other synthetic fibers, forming a matrix that has pockets to retain the loose fill cellulose fibers. The insulating material is described as useful for both thermal and acoustical applications.

Additionally of interest are U.S. Pat. No. 5,362,539, issued Nov. 8, 1994 to Hall et al., assignors to Owens-Corning Fiberglas Technology, and U.S. Pat. No. 6,345,688, issued Feb. 12, 2002 to Veen et al., assignors to Johnson Controls Technology.

The '539 patent describes an insulation assembly that has a mineral fiber core and a polymer film positioned adjacent the surfaces of the core. The film is attached to at least one of the side surfaces of the core and has several openings adjacent at least one of the side surfaces.

The '688 patent describes a tunable sound absorber including a fibrous batt that has coupled to its surface a film, where the fibers penetrate the film to create perforations. The perforations transfer sound energy to the batt and the sound energy is absorbed by the batt. The '688 patent teaches that the porosity, i.e., the frequency of the perforations, as well as their diameter and depth, are the means by which surface resistance can be varied in order to alter acoustical absorption characteristics of sound absorbers as surface resistance creates drag on sound energy as it passes through the perforations. In particular, the '688 patent describes a surface porosity of about 400,000 perforations per square meter as a desirable level of surface resistance to attenuate a wide range of sound frequencies.

Also of interest are U.S. Pat. No. 5,023,131, issued Jun. 11, 1991 to Kwok, assignor to du Pont de Nemours, and U.S. Pat. No. 5,057,168, issued Oct. 15, 1991 to Muncrief, assignor to Greenwood Cotton Insulation Products. Each of these patents describes a batt. The former describes a batt of 75–85 weight % cotton fibers and 15–25 weight % copolyester binder having a melting point from 230–340° F., where the preferred copolyester is terephthalate/isophthalate copolyester. The latter describes a particular process to make a batt of natural fiber, such as cotton, and synthetic binder fiber, such as polyester.

Of background interest is U.S. Pat. No. 4,509,304, issued Apr. 9, 1985 to Epes. This patent describes a device for installing batts of insulation into preexisting structures.

With respect to scrim, of background interest are U.S. Pat. No. 5,994,242, issued Nov. 30, 1999 to Arthurs, assignor to Intertape Polymer Group, and U.S. Pat. No. 5,139,841, issued Aug. 18, 1992 to Makoui et al., assignors to James River Corporation. The former describes a woven scrim layer formed from a thermoplastic polymer having a coating on at least one side of an elastomeric polymer, such as a coating of an ethylene/butene copolymer sold under the trademark FLEXOMER® by Union Carbide. The latter describes a disposable towel of superior wet strength and water absorbency having a scrim coated with a superabsorbent hydrophilic polymer, with a nonwoven fibrous cellulosic web bonded to the coated scrim.

The contents of all patents are hereby incorporated by reference.

Generally, the ability of an acoustical absorber to absorb sound increases with mass. Separation within the material without undue increase of mass (i.e., decreased density) further improves acoustical efficiencies. In addition to having good sound absorption efficiencies, acoustical absorbers should also be as light as possible so as not to contribute substantially to the overall weight of the structure with which the absorber is used. Particularly for automotive vehicles, the absorber should also completely fill the voids and spaces in the vehicle body. Any gaps between the absorber and the automotive body or neighboring absorber material reduces sound absorption. To improve fit and reduce gaps, automotive manufacturers must custom-make, or the user must cut, the absorber to fit the voids and spaces. Of course, this increases the cost and time required to provide the vehicle with the absorber material. An alternative is to make absorbers from compressible material and force the material into the voids and spaces. After compression, the absorber decompresses toward its original volume and fills the voids.

Acoustical absorbers are made from various types of sound absorbing materials, for instance, polyurethane foam which has been molded or die cut to make a rigid form that conforms to the structure with which the absorber is used, such as an automotive vehicle body. Alternatively, the liquid components of the urethane foam can be poured directly into the automotive body and hardened in place into rigid polyurethane. However, not only is acoustical foam expensive, but also the pouring process can produce toxic gasses and therefore requires both that the air is ventilated and that the workers wear protective clothing. Occasionally, the foam will fail to fill the void completely and the defective product will need to be reworked.

Fibrous materials also find use as acoustical absorbers, including use in automotive vehicles. The fibrous materials may include cellulose, glass, polyethylene, polyester, and polypropylene. The fibers are mechanically or chemically bound to form a blanket or batt, often using conventional textile processing techniques.

Drawbacks are inherent in many of the conventional fibrous batt products. Typically, they are heavy, dense, or expensive materials and thus add greatly to the weight or cost of the structure, which is particularly a detriment for automotive vehicles. Some fibrous products are not flexible enough to conform to the abnormal spaces or voids into which they are installed. Also, some fibrous products are hard to install because they are difficult to compress to accommodate small openings and often lack the ability to recover well from compression when installed into a void. Moreover, some of the fibrous materials, particularly fiberglass, present environmental and handling concerns. Additionally, some fibrous products, particularly cotton, easily pick up dust and dirt during handling, so it is desirous to cover them with some kind of plastic, but then they can lose flexibility and/compressibility.

For the foregoing reasons, a need exists for an improved, acoustical absorber. Ideally the absorber should show good absorption of low and high frequency sounds as well as being flexible in order to conform to abnormal voids and spaces in structures, such as buildings and motor vehicle bodies. The absorber should be compressible and then recover quickly from compression, be easy to install quickly in an assembly line, and be environmentally safe and economical to produce.

SUMMARY AND OBJECTS OF THE INVENTION

Accordingly, it is an object of the present invention to provide a new acoustical absorber, having one or more of the novel features of this invention as here shown and described.

Further, it is an object of the present invention to provide a new method for installing an acoustical absorber in a structure, the method having one or more of the novel features of this invention as here shown and described.

Another object of the present invention is to provide a method of making an acoustical absorber, which method is easy and simple and convenient.

The present invention is directed to an acoustical absorber that meets these objectives and satisfies the needs in the art.

Accordingly, the present invention provides an acoustical absorber comprising (a) a first synthetic polymeric scrim layer, (b) a first synthetic polymeric film layer, (c) an interior fibrous batt layer, (d) a second synthetic polymeric film layer, and (e) a second synthetic polymer scrim layer. The first synthetic polymeric scrim layer has interstices and has a melting point higher than that of the first synthetic polymeric film layer, and the first film fills some of the interstices of the first scrim, the resultant being an embedded first scrim/first film combination. Also, the second synthetic polymeric scrim layer has interstices and has a melting point higher than that of the second synthetic polymeric film layer, and the second film fills some of the interstices of the second scrim, the resultant being an embedded second scrim/second film combination. The interior batt layer is adhered to the first film layer and the second film layer. The acoustical absorber is flexible and has an air permeability ranging from about 500 Rayles to about 26,000 Rayles. Preferably, the acoustical absorber recovers at least about 80% of its precompression volume after a compressive force is removed.

In a particularly preferred embodiment, the invention provides acoustical absorber comprising (a) a first scrim layer comprising polypropylene, (b) a first film layer comprising linear low density polyethylene, (c) an interior batt layer comprising a non-woven material having about 60% to about 90% by weight cotton fiber and about 10% to about 40% by weight polyester fiber, (d) a second film layer comprising linear low density polyethylene, and (e) a second scrim layer comprising polypropylene. Also, the first scrim layer has interstices, and the first film fills some of the interstices of the first scrim, the resultant being an embedded first scrim/first film combination. Additionally, the second scrim layer has interstices, and the second film fills some of the interstices of the second scrim, the resultant being an embedded second scrim/second film combination. Furthermore, the interior batt layer is adhered to the first film layer and the second film layer. This preferred acoustical absorber is flexible, recovers at least about 80% of its precompression volume of after a compressive force is removed, and has an air permeability ranging from about 500 Rayles to about 26,000 Rayles.

Further in accordance with the present invention, a method for acoustically insulating a structure is provided. The method comprises the steps of (A) providing an acoustical absorber and (B) installing the acoustical absorber in a void of the structure. The acoustical absorber comprises (a) a first synthetic polymeric scrim layer, (b) a first synthetic polymeric film layer, (c) an interior fibrous batt layer, (d) a second synthetic polymeric film layer, and (e) a second synthetic polymer scrim layer. The first synthetic polymeric scrim layer has interstices and has a melting point higher than that of the first synthetic polymeric film layer, and the first film fills some of the interstices of the first scrim, resulting in an embedded first scrim/first film combination. Also, the second synthetic polymeric scrim layer has interstices and has a melting point higher than that of the second synthetic polymeric film, and the second film fills some of the interstices of the second scrim, resulting in an embedded second scrim/second film combination. Furthermore, the interior batt layer is adhered to the first film layer and the second film layer. The acoustical absorber is flexible and has an air permeability ranging from about 500 Rayles to about 26,000 Rayles. Moreover, the method may further comprise the steps of compressing the absorber to less than its precompression volume prior to installing the absorber and releasing the absorber from compression following the installing step allowing the absorber to decompress and to fill the void.

Additionally in accordance with the present invention, a method for making an acoustical absorber is provided. The method comprises the steps of: (A) placing in contact a flexible synthetic polymeric film sheet and a flexible synthetic polymeric scrim sheet, wherein the scrim sheet has interstices and has a melting point higher than that of the film sheet, (B) heating the scrim sheet and film sheet so that the film sheet fills some of the interstices of the scrim sheet, resulting in an embedded scrim/film combination, (C) sandwiching a fibrous batt sheet between two pieces of the embedded scrim/film combination, with the film side of the scrim/film combination adjacent the batt sheet, (D) heating the sandwich of scrim/film/fibrous batt/film/scrim to adhere the film to the fibrous batt, and (E) obtaining a flexible acoustical absorber having an air permeability ranging from about 500 Rayles to about 26,000 Rayles. Moreover, the method may comprise that the film sheets, the scrim sheets, and the batt sheet are placed together in a sandwich of scrim/film/fibrous batt/film/scrim and heated simultaneously.

DETAILED DESCRIPTION OF THE INVENTION

The present invention provides a superior acoustical absorber, which may be installed in any desired void location or other spaces of a structure, for instance, during assembly of an automotive vehicle or assembly of a building, in order to absorb low and high frequency sound. The acoustical absorber may be used in or on the pillars, wheelhouses, cowl sides, roof rails, and quarter trim panels and other locations of an automotive vehicle. The acoustical absorber may be used in or on the walls, ceilings, and floors and other locations of a building.

The acoustical absorber of the present invention has many advantages, including flexibility and compression recovery. Such advantages are particularly realized in an automotive vehicle body void. For instance, as the automotive vehicle moves by on an assembly line, the worker compresses the absorber and places it in the desired location. When the worker releases the absorber, it expands and may fill and conform to the area into which the absorber is installed, whereby the absorber may need no cutting to be shaped to fit around or in obstacles in the installation area. The expansion and resultant filling of the space may enhance the overall acoustical performance of the absorber.

Additionally, recovery from compression is also important in shipping since the absorber may be tightly compressed during packaging to minimize shipping volume. Once removed from packaging, the absorber quickly returns to or close to its original precompressed volume. The absorber does not collapse over time, thus retaining its bulk, structural integrity, and sound-absorbing properties.

Moreover, in a preferred embodiment, using a low-weight material for the batt portion of the absorber significantly reduces the cost of producing the absorber, as a low-weight absorber requires less material to manufacture. The light weight of the absorber is an advantage, especially in view of the weight concerns of automotive vehicle manufacturers. This advantage meets the desire of the automobile industry to save weight. Also, the batt portion of the acoustical absorber is able to be made with waste, second grade, or recycled fibers, reducing the cost of raw materials.

Furthermore, the absorber typically exhibits excellent sound absorption, including attenuation of a particularly wide spectrum of sound of different wavelengths.

In accordance with the present invention, an acoustical absorber is provided generally having 5 layers, where an interior layer is a batt, and on each side of the batt is adhered plastic, namely a synthetic polymeric film layer and a synthetic polymeric scrim layer. Accordingly, the structure, in general, comprises scrim/film/batt/film/scrim. By interior batt layer, it is intended to mean that the batt layer is disposed between the polymeric layers, and not necessarily completely surrounded by these polymeric layers.

The batt may be made of natural and/or man-made fibers and may be woven or non-woven. The proportion of natural fibers and synthetic fibers for a preferred embodiment of the batt in accordance with the present invention can vary as desired. Preferably, the batt has been made of a natural fiber and has been formed as a flexible, non-woven batt. The batt is of a predetermined thickness and is characteristically of low density and recovers quickly following compression. Batts are commercially available, and suitable ones are made of cellulosic material, such as cotton.

A non-woven batt for use in a preferred embodiment of the present invention used to be available from Greenwood Cotton Insulation Products, Inc. of Greenwood, S.C., U.S.A. While the process used for making the batt is proprietary, the process is similar to that described in the above-mentioned U.S. Pat. No. 5,057,168. The process for making the batt as described in the '168 patent generally comprises the steps of forming a batt from insulative fibers. Binder fibers are blended with the insulative fibers or added to a web of insulative fibers during the batt-forming step. Alternatively, "stilt" fibers can be spread between lapped layers. The stilt fibers function to spread apart and to maintain a space between adjacent lapped web layers comprising the batt. Subsequently, the batt is heated to a temperature sufficient to cause the binder fibers to soften and to adhere to the insulative fibers in order to connect insulative fibers to one another. The batt is then cooled to harden the softened binder fibers, thus forming the batt structure.

In accordance with a preferred embodiment of the present invention, some of the fibers in the batt are natural fibers and some of the fibers in the batt are synthetic binder fibers. More preferably, the natural fibers of the batt are cotton. However, wool, flax, jute, mohair, silk, ramie, hemp, asbestos or mixtures thereof may be suitable for the natural fibers. Natural fiber seconds that have been separated into individual fibers or small groups of fibers can be used, especially those from denim and other garments. Preferably, the natural fiber is cotton from waste cotton material, which is sometimes referred to as "cotton shoddy". To the extent that synthetic fibers (i.e., man-made polymeric fibers) are used for the preferred embodiment of the batt in accordance with the present invention, the synthetic fibers may be selected from rayon, acetate, nylon (polyamide), polyester (PE), polypropylene (PP), polyethylenes, acrylics, vinyls, or mixtures thereof. An example of a suitable nylon is KEVLAR® (registered trademark for high strength polyaramide fiber, i.e., a type of nylon, made and sold by du Pont de Nemours). Any synthetic fiber can be utilized as a binder fiber. The preferred synthetic binder fiber is polyester (PE) fiber, and also preferred is polypropylene (PP) fiber.

In accordance with the preferred embodiment of the present invention, about 50% or more by weight of the fibers in the batt are natural fibers, and about 50% or less by weight of the fibers in the batt are synthetic fibers. The amount of natural fibers is typically in the range of from about 60% to about 90% by weight of the batt, more preferably about 75% to about 90%, and most preferably from about 80% to about 90%. Synthetic binder fibers are combined with the natural fibers typically in the range of about 10% to about 40% by weight of the batt, more preferably about 10% to about 25%, and most preferably about 10% to about 20%. These natural fibers and synthetic fibers, when bonded together, result in a batt that is economical to produce. Not only can the batt be formed of waste cloth and other waste materials, but also the batt, when combined with the polymeric film and the scrim to form a 5-layer structure as further described below, has excellent acoustical insulating properties.

Preferably, the batt for use in the acoustical absorber of the present invention is non-woven and has a bulk density of about 3 pounds per cubic foot or less, and more preferably, less than about 2 pounds per cubic foot. While batts having a density over about 3 pounds per cubic foot will perform well, the material is cost inefficient to produce because the return on performance does not justify the increased manufacturing cost for using more fiber. Also, the heavier material without a commensurate performance enhancement becomes a distinct disadvantage to automotive manufacturers, who are always conscious of overall vehicle weight.

At the preferred densities, the batt material preferably has a thickness in the range of from about 0.25 inch to about 5 inches, and more preferably, from about 0.50 inch to about 4.5 inches. At a thickness of under about 0.25 inch, the material typically is too flimsy. The material may be slit and/or cut into individual pieces of any desired size and shape.

Important features of the preferred embodiment of the batt are its unique combination of flexibility and compressibility.

More importantly, the batt has good recovery from compression, rapidly returning to its original, precompression volume when the compressive forces are released. The batt recovers at least about 80% of its precompression volume immediately after the compressive forces are removed and more preferably about 95%. This property is tested by compressing or squeezing the material as though the compressed material were about to be inserted into a representative void in an automobile and then releasing the material. The thickness of the recovered material is then measured, and the thickness of the recovered material is compared with the thickness of the precompressed material.

In addition to the above properties, the preferred embodiment of the batt material is resistant to mildew, staining, bleeding and water wicking. There is no disagreeable odor associated with the material, wet or dry. Since the material should have a certain amount of resistance to combustion when in use, the batt material is preferably chemically treated during the manufacturing process to render the material flame resistant. Also, the material should be chemically treated to be vermin resistant and non-corrosive.

Also for use in a preferred embodiment of the acoustical absorber, Acoustek Nonwovens manufactures a batt of cotton shoddy and polyester, as further described in the Examples below.

As noted above, other exterior layers are adhered to the top and the bottom sides of the pieces of batt, resulting in the 5-layer structure of scrim/film/batt/film/scrim.

Each of the polymeric films layers disposed on each side of the batt is of a same or a different synthetic polymer. Suitable synthetic polymers for the film layers are any of those that form flexible sheets, and may be chosen from high density polyethylene (HDPE), medium density polyethylene (MDPE), low density polyethylene (LDPE), linear low density polyethylene (LLDPE), very low density linear polyethylene (VLDPE), ultra low density polyethylene (ULDPE), polypropylene (PP), polyester (PE), ethylene vinyl acetate copolymer (EVA), nylon, or combinations thereof. Each layer of the synthetic film should have a thickness of less than about 2 mils (thousandths of an inch), more preferably a thickness between about 0.5 mil and 1.5 mils, and most preferably a thickness between about 1 mil and about 1.5 mils.

Preferred is that each of the two film layers is the same linear low density polyethylene (LLDPE). Also, using the same low density polyethylene (LDPE) for each of the two film layers is very suitable.

The polymer or mixture of polymers of a scrim layer must have a higher melting point (generally described as a glass transition temperature for polymers) than the polymer or mixture of polymers of the adjacent film layer. Otherwise, the same synthetic polymers generally may be used for the two scrim layers as are used for the two film layers.

Thus, each of the polymeric scrim layers disposed on each of the polymeric film layers is of a same or a different synthetic polymer. Suitable synthetic polymers for the scrim layers are any of those that form flexible sheets, and may be chosen from high density polyethylene (HDPE), medium density polyethylene (MDPE), low density polyethylene (LDPE), linear low density polyethylene (LLDPE), very low density linear polyethylene (VLDPE), ultra low density polyethylene (ULDPE), polypropylene (PP), polyester (PE), ethylene vinyl acetate copolymer (EVA), nylon, or combinations thereof. The synthetic polymeric scrim may be woven or non-woven, but preferably is non-woven scrim. Each layer of the synthetic polymeric scrim should have a thickness of less than about 2 mils (thousandths of an inch), more preferably a thickness between about 0.5 mil and 1 mil, and most preferably a thickness between about 1 mil and about 1.5 mils. Also, each layer of the synthetic polymeric scrim should have a density ranging between about 0.4 and about 2 ounces per square yard, more preferably ranging between about 0.5 and about 1.5 ounces per square yard, and most preferably ranging between about 0.5 and about 1 ounce per square yard.

Preferred is that each of the two scrim layers is the same non-woven polypropylene (PP) with a density of about 0.5 ounce per square yard.

While cutting and attaching the various layers can be accomplished any number of ways using conventional machinery, or even by hand, a suitable automated method to make the inventive acoustical absorber is to use heated nip rollers.

For instance, first a sheet of film is placed adjacent a sheet of scrim, and the two are run through the heated nip rollers. Scrim inherently has small interstices or voids. Hence, as the heated nip rollers pinch the two together under pressure and tension, the film begins to soften. The film begins to become embedded into and begins to fill the interstices in the scrim. As the film is further embedded into the scrim, fine interstices are created at the scrim edges, i.e., the interface of the scrim with the film, resulting in an embedded scrim/film combination. Thus, only some, but not all, of the interstices in the scrim are completely filled, i.e., embedded with the film. Next, a piece of batt is sandwiched on each of its two sides between two pieces of the embedded scrim/film combination, with the film side of each scrim/film combination adjacent each respective side of the two sides of the batt, (i.e., with the scrim on the outside), and run through the heated nip rollers. As the heated nip rollers pinch the sandwich together under pressure and tension, the heat indirectly transfers through the scrim to the film, permitting softening of the two film surfaces adjacent each side of the batt so that each film adheres to each side of the batt. The resultant is a laminated 5-layer structure of scrim/film/batt/film/scrim. Still, some but not all of the interstices in the scrim are completely filled, i.e., embedded with the film.

The method of making the acoustical absorber may include that all 5 layers may be placed together in a sandwich and then run through the heated nip rollers.

Since not all interstices in the scrim are completely sealed from the film becoming embedded into the scrim, the small remaining interstices provide for a desirable air permeability for the resultant laminated 5-layer structure of scrim/film/batt/film/scrim ranging from about 500 to about 26,000 Rayles, more preferably from about 1000 to about 25,000 Rayles, and most preferably from about 1500 to about 20,000 Rayles. The acoustical absorber in accordance with the present invention may have more layers, as long as the air permeability ranges from about 500 to about 26,000 Rayles, more preferably from about 1000 to about 25,000 Rayles, and most preferably from about 1500 to about 20,000 Rayles. An acoustical absorber with an air permeability in this range will be an acoustical product with superior noise absorption characteristics. This range should provide a surface resistance that effectively attenuates sound frequencies ranging from about 50 to about 10,000 Hz.

Furthermore, the air permeability, together with the use of flexible polymeric film and flexible polymeric scrim, allows the absorber to retain essentially the same flexibility, compressibility and recovery from compression, as the batt by itself has. Thus, the absorber should recover at least about 80% of its precompression volume immediately after the compressive forces are removed and more preferably about 95%.

Moreover, the air permeability, flexible polymeric film, and flexible polymeric scrim help keep the batt clean during handling (particularly for a cotton batt in accordance with the preferred embodiment, as cotton batts tend to pick up dust and dirt during handling), without the prior art problems of the plastic substantially decreasing flexibility and recovery from compression.

EXAMPLES

Several laminates of a 5-layer structure of scrim/film/batt/film/scrim were made as described above by first embedding the film into the scrim using the heated nip rollers, and then using the heated nip rollers to make a sandwich of the resultant with a batt in the middle.

Each of the scrim layers was the same non-woven polypropylene (PP) with a density of about 0.5 ounce per square yard. Each of the polymeric film layers was either low density polyethylene (LDPE) or linear low density polyethylene (LLDPE).

Each batt layer was a non-woven batt, with about 60% to about 90% by weight cotton fiber and about 10% to about 40% by weight polyester (PE) fiber. The batt was similar to that made and sold by Greenwood Cotton Insulation Products, Inc. of Greenwood, S.C., U.S.A., in accordance with the above-noted '168 patent to Muncrief, but the batt was made as follows by Acoustek Nonwovens. Natural fiber (cotton shoddy) was treated with fire retardant (ammonium sulfate provided by Guardex) and then blended with a bicomponent synthetic fiber having an outer layer of low met polyester and an inner core of a higher melting polyester. Next, the blended fibers were passed through a Wise garnet to form a web that was cross-lapped to the desired thickness, followed by passing through an oven and then a cooling chamber to melt and to cool the synthetic binder fiber that set the batt height.

The air permeability in Rayles was measured for each 5-layer structure of scrim/film/batt/film/scrim. The results are summarized as follows in the TABLE below.

TABLE

| Sample Number | 5-Layer Structure (Scrim/Film/Batt/Film/Scrim) | Air Permeability (Rayles) |
|---|---|---|
| 1 | PP/LDPE/Cotton + PE/LDPE/PP | 12350 |
| 2 | PP/LDPE/Cotton + PE/LDPE/PP | 4900 |
| 3 | PP/LDPE/Cotton + PE/LDPE/PP | 9125 |
| 4 | PP/LDPE/Cotton + PE/LDPE/PP | 17960 |
| 5 | PP/LDPE/Cotton + PE/LDPE/PP | 4780 |
| 6 | PP/LLDPE/Cotton + PE/LLDPE/PP | 17825 |
| 7 | PP/LLDPE/Cotton + PE/LLDPE/PP | 7330 |
| 8 | PP/LLDPE/Cotton + PE/LLDPE/PP | 1860 |
| 9 | PP/LLDPE/Cotton + PE/LLDPE/PP | 755 |

Although the present invention has been shown and described in detail with regard to only a few exemplary embodiments of the invention, it should be understood by those skilled in the art that it is not intended to limit the invention to the specific embodiments disclosed. Various modifications, omissions, and additions may be made to the disclosed embodiments without materially departing from the novel teachings and advantages of the invention, particularly in light of the foregoing teachings. Accordingly, it is intended to cover all such modifications, omission, additions, and equivalents as may be included within the spirit and scope of the invention as defined by the following claims.

What is claimed is:

1. An acoustical absorber comprising:
   a. a first synthetic polymeric scrim layer,
   b. a first synthetic polymeric film layer,
   c. an interior fibrous batt layer,
   d. a second synthetic polymeric film layer, and
   e. a second synthetic polymer scrim layer,
   wherein
   i. the first synthetic polymeric scrim layer has interstices and has a melting point higher than that of the first synthetic polymeric film layer, and the first film fills some of the interstices of the first scrim, resulting in an embedded first scrim/first film combination,
   ii. the second synthetic polymeric scrim layer has interstices and has a melting point higher than that of the second synthetic polymeric film layer, and the second film fills some of the interstices of the second scrim, resulting in an embedded second scrim/second film combination,
   iii. the interior batt layer is adhered to the first film layer and the second film layer, and
   iv. the acoustical absorber is flexible and has an air permeability ranging from about 500 Rayles to about 26,000 Rayles.

2. The acoustical absorber according to claim 1, wherein the batt comprises a fiber selected from the group consisting of woven fiber, non-woven fiber, and combinations thereof.

3. The acoustical absorber according to claim 1, wherein the batt comprises a fiber selected from the group consisting of natural fiber, synthetic fiber, and combinations thereof.

4. The acoustical absorber according to claim 3, wherein the batt comprises:
   about 50% or more by weight natural fiber, and
   about 50% or less by weight synthetic fiber.

5. The acoustical absorber according to claim 4, wherein the batt comprises:
   about 60% to about 90% by weight natural fiber, and
   about 10% to about 40% by weight synthetic fiber.

6. The acoustical absorber according to claim 3, wherein the natural fiber of the batt comprises a fiber selected from the group consisting of cotton, wool, flax, jute, mohair, silk, ramie, hemp, asbestos, and combinations thereof.

7. The acoustical absorber according to claim 3, wherein the synthetic fiber of the batt comprises a fiber selected from the group consisting of rayon, acetate, nylon, polyester, polypropylene, polyethylene, acrylic, vinyl, and combinations thereof.

8. The acoustical absorber according to claim 1, wherein the batt comprises a material that has a density of about 3 pounds per cubic foot or less.

9. The acoustical absorber according to claim 1, wherein the first synthetic polymeric film layer and the second synthetic polymeric film layer comprise a same or a different synthetic polymer, and the synthetic polymer is selected from the group consisting of high density polyethylene, medium density polyethylene, low density polyethylene, linear low density polyethylene, very low density linear polyethylene, ultra low density polyethylene, polypropylene, polyester, ethylene vinyl acetate copolymer, nylon, and combinations thereof.

10. The acoustical absorber according to claim 1, wherein the first synthetic polymeric scrim layer and the second synthetic polymeric scrim layer comprise a same or a different synthetic polymer, and the synthetic polymer is selected from the group consisting of high density polyethylene, medium density polyethylene, low density polyethylene, linear low density polyethylene, very low density linear polyethylene, ultra low density polyethylene, polypropylene, polyester, ethylene vinyl acetate copolymer, nylon, and combinations thereof.

11. The acoustical absorber according to claim 1, wherein the absorber recovers at least about 80% of its precompression volume after a compressive force is removed.

12. The acoustical absorber according to claim 1, wherein the absorber has an air permeability ranging from about 1000 Rayles to about 25,000 Rayles.

13. An acoustical absorber comprising:
  a. a first scrim layer comprising polypropylene,
  b. a first film layer comprising linear low density polyethylene,
  c. an interior batt layer comprising a non-woven material having about 60% to about 90% by weight cotton fiber and about 10% to about 40% by weight polyester fiber,
  d. a second film layer comprising linear low density polyethylene, and
  e. a second scrim layer comprising polypropylene,
wherein
  i. the first scrim layer has interstices, and the first film fills some of the interstices of the first scrim, resulting in an embedded first scrim/first film combination,
  ii. the second scrim layer has interstices, and the second film fills some of the interstices of the second scrim, resulting in an embedded second scrim/second film combination,
  iii. the interior batt layer is adhered to the first film layer and the second film layer, and
  iv. the acoustical absorber is flexible, recovers at least about 80% of its precompression volume of after a compressive force is removed, and has an air permeability ranging from about 500 Rayles to about 26,000 Rayles.

14. A method for acoustically insulating a structure, the method comprising the steps of:
  A. providing an acoustical absorber comprising:
    a. a first synthetic polymeric scrim layer,
    b. a first synthetic polymeric film layer,
    c. an interior fibrous batt layer,
    d. a second synthetic polymeric film layer, and
    e. a second synthetic polymer scrim layer,
  wherein
    i. the first synthetic polymeric scrim layer has interstices and has a melting point higher than that of the first synthetic polymeric film layer, and the first film fills some of the interstices of the first scrim, resulting in an embedded first scrim/first film combination,
    ii. the second synthetic polymeric scrim layer has interstices and has a melting point higher than that of the second synthetic polymeric film layer, and the second film fills some of the interstices of the second scrim, resulting in an embedded second scrim/second film combination,
    iii. the interior batt layer is adhered to the first film layer and the second film layer, and
    iv. the acoustical absorber is flexible and has an air permeability ranging from about 500 Rayles to about 26,000 Rayles, and
  B. installing the acoustical absorber in a void of the structure.

15. The method according to claim 14, wherein the structure comprises a motor vehicle or a building.

16. The method according to claim 14, the method further comprising the steps of:
  compressing the acoustical absorber to less than the volume the acoustical absorber occupied before compression prior to installing the acoustical absorber, and
  releasing the acoustical absorber from compression following the installing step for allowing the acoustical absorber to recover to fill the void.

17. The method according to claim 16, wherein the structure comprises a motor vehicle or a building.

18. The method according to claim 14, wherein the absorber has an air permeability ranging from about 1000 Rayles to about 25,000 Rayles.

19. A method for making an acoustical absorber, the method comprising the steps of:
  A. placing in contact a flexible synthetic polymeric film sheet and a flexible synthetic polymeric scrim sheet, wherein the scrim sheet has interstices and has a melting point higher than that of the film sheet,
  B. heating the scrim sheet and the film sheet so that the film sheet fills some of the interstices of the scrim sheet, resulting in an embedded scrim/film combination,
  C. sandwiching a fibrous batt sheet between two pieces of the embedded scrim/film combination, with the film side of the scrim/film combination adjacent the batt sheet,
  D. heating the sandwich of scrim/film/fibrous batt/film/scrim to adhere the film to the fibrous batt, and
  E. obtaining a flexible acoustical absorber having an air permeability ranging from about 500 Rayles to about 26,000 Rayles.

20. The method according to claim 19, wherein the batt comprises a fiber selected from the group consisting of natural fiber, synthetic fiber, and combinations thereof.

21. The method according to claim 19, wherein the two synthetic polymeric film sheets comprise a same or a different synthetic polymer, and the synthetic polymer is selected from the group consisting of high density polyethylene, medium density polyethylene, low density polyethylene, linear low density polyethylene, very low density linear polyethylene, ultra low density polyethylene, polypropylene, polyester, ethylene vinyl acetate copolymer, nylon, and combinations thereof.

22. The method according to claim 19, wherein the two synthetic polymeric scrim sheets comprise a same or a different synthetic polymer, and the synthetic polymer is selected from the group consisting of high density polyethylene, medium density polyethylene, low density polyethylene, linear low density polyethylene, very low density linear polyethylene, ultra low density polyethylene, polypropylene, polyester, ethylene vinyl acetate copolymer, nylon, and combinations thereof.

23. The method according to claim 19, wherein the absorber recovers at least about 80% of its precompression volume after a compressive force is removed.

24. The method according to claim 19, wherein the absorber has an air permeability ranging from about 1000 Rayles to about 25,000 Rayles.

25. The method according to claim 19, wherein the film sheets, the scrim sheets, and the batt sheet are placed together in a sandwich of scrim/film/fibrous batt/film/scrim and heated simultaneously to obtain the acoustical absorber.

26. The method according to claim 25, wherein the absorber recovers at least about 80% of its precompression volume after a compressive force is removed.

27. The method according to claim 25, wherein the absorber has an air permeability ranging from about 1000 Rayles to about 25,000 Rayles.

* * * * *